United States Patent Office 2,831,872
Patented Apr. 22, 1958

2,831,872

SYNTHESIS OF STEROIDS

Josef Fried and Gordon H. Thomas, New Brunswick, N. J., assignors to Olin Mathieson Chemical Corporation, New York, N. Y., a corporation of Virginia No Drawing. Application February 7, 1957
Serial No. 638,675

4 Claims. (Cl. 260—397.3)

This invention relates to, and has for its object the provision of, a method of preparing 16-halo steroids of the androstane (including the androstene) series.

The compounds prepared by the process of this invention are disclosed in our U. S. application, Serial No. 638,674, filed of even date herewith, and include the 16-halo steroids of the androstane series, particularly the 16-halo-$\Delta^4$-androstene-3,17-diones (e. g., 16$\alpha$-fluoro-$\Delta^4$-androstene-3,17-dione; 16$\beta$-fluoro-$\Delta^4$-androstene-3,17-dione; and 16$\beta$-choloro-$\Delta^4$-androstene-3,17-dione). In accordance with the process of this invention, these compounds are prepared by oxidizing the corresponding 16-halo-11-desoxycorticosterone (i. e., 16-halo-$\Delta^4$-pregnene-17$\alpha$,21-diol-3,20-dione), as by treatment with a bismuthate (e. g., sodium bismuthate) or a hexavalent chromium compound (e. g., chromic acid). The reaction can be conducted at any normal temperature but, for ease in handling, is preferably conducted at ambient temperature. The reaction is preferably conducted in an organic solvent for the steroid reactant.

The 16-halo-$\Delta^4$-pregnene-17$\alpha$,21-diol-3,20-diones employed as starting materials in the process of this invention can be prepared from the corresponding 16$\alpha$,17$\alpha$-epoxy-$\Delta^4$-pregnene-21-ol-3,20-diones or the 21-esters thereof (such as the hydrocarbon carboxylic acid esters of less than ten carbon atoms, as exemplified by the lower alkanoic acids), in which case the esterifying acid must be hydrolyzed off before or during the oxidation step. To prepare these starting materials, the 16,17-epoxide is reacted with the desired hydrogen halide (i. e., hydrochloric acid, hydrobromic acid and hydroiodic acid). If a 21-ester is used in the reaction, it can then be saponified by treatment with an acid such as perchloric acid.

As stated in the aforementioned application, the compounds prepared by the process of this invention are physiogolically active steroids which possess androgenic activity.

The following Examples A and B illustrate the preparation of the starting materials used in the process of this invention (all temperatures being in centigrade):

EXAMPLE A

16$\beta$-chloro-$\Delta^4$-pregnene-17$\alpha$,21 diol-3,20-dione (a) PREPARATION OF 16$\beta$-CHLORO-$\Delta^4$-PREGNENE-17$\alpha$,21-DIOL-3,20-DIONE 21-ACETATE A solution of 16$\alpha$,17$\alpha$-oxido-$\Delta^4$-pregnene-21-ol-3,20-dione 21-acetate (6 g.) in glacial acetic acid (250 ml.) and concentrated hydrochloric acid (4 ml.) is allowed to stand at room temperature for 18 hours. The mixture is then diluted with water, the precipitated solid collected and crystallized from acetone-hexane. The resulting chlorohydrin (about 3.9 g.) melts at about 202–205°;

$\lambda_{max}^{Nujol}$ 3.05, 5.70, 5.75, 6.05, 6.22$\mu$.

(b) PREPARATION OF 16$\beta$-CHLORO-$\Delta^4$-PREGNENE-17$\alpha$,21-DIOL-3,20-DIONE A suspension of 16$\beta$-chloro-$\Delta^4$-pregnene-17$\alpha$,21-diol-3,20-dione 21-acetate (3.5 g.) in methanol (70 ml.) and 70% perchloric acid (1.75 ml.) is stirred at room temperature for 18 hours. The mixture is then diluted with water, the precipitated solid collected, washed with dilute sodium acetate solution and water, dried and crystallized from acetone-hexane. The deacetylated compound decomposes at about 162–166° (rapid heating);

$\lambda_{max}^{Nujol}$ 3.0, 5.83, 6.03, 6.19$\mu$.

Analysis.—Calculated for $C_{21}H_{29}O_4Cl$ (380.90): C, 66.20; H, 7.67. Found: C, 66.15; H, 7.85.

EXAMPLE B

16$\beta$-bromo-$\Delta^4$-pregnene-17$\alpha$,21-diol-3,20-dione

By substituting hydrobromic acid for the hydrochloric acid in the procedure of part a of Example A, there is obtained 16$\beta$-bromo-$\Delta^4$-pregnene-17$\alpha$,21-diol-3,20 dione.

In a similar manner, if hydrogen iodide is substituted for the hydrochloric acid in Example A, 16$\beta$-iodo-$\Delta^4$-pregnene-17$\alpha$,21-diol-3,20-dione is produced.

The following examples illustrate the process of this invention:

EXAMPLE 1

16$\beta$-chloro-$\Delta^4$-androstene-3,17-dione

A solution of 16$\beta$-chloro-$\Delta^4$-pregnene-17$\alpha$,21-diol-3,20-dione (1 g.) in 50% aqueous acetic acid (200 ml.) is stirred at room temperature with sodium bismuthate (10 g.) for 2 hours. The solution is then filtered and the inorganic material washed with chloroform (300 ml.). The combined filtrate and washings are successively washed with water, 5% potassium hydroxide solution and water. The residue left after evaporation of the chloroform is crystallized from acetone-hexane to give the 17-ketone (620 mg.) melting at about 175–177°; $[\alpha]_D+181°$ (c, 0.9 in CHCl$_3$);

$\lambda_{max}^{alc}$ 237 m$\mu$ (17,600); $\lambda_{max}^{Nujol}$ 5.72, 6.01, 6.22$\mu$ Analysis.—Calculated for $C_{19}H_{25}O_2Cl$ (320.85); C, 71.10; H, 7.85; Cl, 11.05. Found: C, 70.85; H, 7.74; Cl, 10.89.

EXAMPLE 2

16$\beta$-bromo-$\Delta^4$-androstene-3,17-dione

By substituting one gram of 16$\beta$-bromo-$\Delta^4$-pregnene-17$\alpha$,21-diol-3,20-dione for the 16$\beta$-chloro-$\Delta^4$-pregnene-17$\alpha$,21-diol-3,20-dione in the procedure of Example 1, there is obtained 16$\beta$-bromo-$\Delta^4$-androstene-3,17-dione.

Similarly, 16$\beta$-iodo-$\Delta^4$-pregnene,17$\alpha$,21-diol-3,20-dione yields 16$\beta$-iodo-$\Delta^4$-androstene-3,17-dione.

The invention may be otherwise variously embodied within the scope of the appended claims.

We claim:

1. A process for preparing 16-halo-$\Delta^4$-androstene-3, 17-dione, which comprises treating 16-halo-$\Delta^4$-pregnene-17$\alpha$, 21-diol-3,20-dione with a compound selected from the group consisting of bismuthates and hexavalent chromium compounds, and recovering the 16-halo-$\Delta^4$-androstene-3,17-dione formed.

2. The process of claim 1, wherein the reactant is a bismuthate.

3. The process of claim 2, wherein the steroid reactant is 16$\beta$-chloro-$\Delta^4$-pregnene-17$\alpha$,21-diol-3,20-dione.

4. The process of claim 2, wherein the steroid reactant is 16$\beta$-bromo-$\Delta^4$-pregnene-17$\alpha$,21-diol-3,20-dione.

No references cited.